United States Patent

[11] 3,599,155

[72] Inventors Robert B. McDowell
Beltsville;
Ronald V. Schreiber, Laurel, both of, Md.
[21] Appl. No. 540,093
[22] Filed Apr. 4, 1966
[45] Patented Aug. 10, 1971
[73] Assignee The United States of America as represented by the Secretary of the Navy

[54] METHOD FOR EXTRACTING INFORMATION CONTAINED IN A SIGNAL DEGRADED BY NOISE
7 Claims, 3 Drawing Figs.

[52] U.S. Cl. 340/172.5, 325/42
[51] Int. Cl. G06f 7/00, H04b 15/00
[50] Field of Search 340/172.5, 170, 146.1, 146.3, 347; 329/107; 325/323, 42; 235/181, 153, 164, 157; 343/5, 17.1; 178/66

[56] References Cited

UNITED STATES PATENTS

| | | | |
|---|---|---|---|
| 3,212,014 | 10/1965 | Wiggins et al. | 329/107 |
| 3,235,844 | 2/1966 | White | 340/172.5 |
| 3,261,001 | 7/1966 | Magnin | 340/172.5 |
| 3,268,824 | 8/1966 | Hinrichs et al. | 325/323 X |
| 3,302,185 | 1/1967 | Cox et al. | 340/172.5 |
| 3,312,944 | 4/1967 | Kull et al. | 340/172.5 |
| 3,333,247 | 7/1967 | Hadley et al. | 340/172.5 |
| 3,340,515 | 9/1967 | Little | 340/172.5 |
| 3,344,409 | 9/1967 | Townsend | 340/172.5 |
| 3,354,438 | 11/1967 | Sandlin et al. | 340/172.5 |

*Primary Examiner*—Paul J. Henon
*Attorneys*—J. P. Dunlavey and J. O. Tresansky

ABSTRACT: A method for recovering pulse code modulation (PMC) telemetry severely degraded by noise. In a preferred embodiment of the invention a noise degraded PCM signal is digitized after demodulation from its associated carrier to produce an output consisting of data words. A computer performs logical and numerical operations on the data words to enable the detection of the PCM waveform, ignoring the associated noise.

ROBERT B. McDOWELL
RONALD V. SCHREIBER
INVENTORS

BY

ATTORNEY

ROBERT B. McDOWELL
RONALD V. SCHREIBER
INVENTORS

BY [signature]

ATTORNEY

METHOD FOR EXTRACTING INFORMATION CONTAINED IN A SIGNAL DEGRADED BY NOISE

This invention relates to an improved method for recovering severely degraded pulse code modulation telemetry. More particularly, it relates to a method utilizing a digital computer which accepts data representing a pulse code modulation (PCM) waveform degraded by noise and extracts the information carried by the PCM signals, presenting the results as a printed set of binary numbers.

In the past a substantial amount of pulse code modulation (PCM) telemetry has had to be discarded due to its degradation by noise. For example, radioactivity resulting from high altitude atomic tests has drastically affected the quality of telemetry data received from many satellites. In some instances interference with PCM waveforms was so severe that pulse information was not visually discernible from oscillographic records and was unrecoverable by the standard bit synchronizer method.

One of the more important objects of the present invention, therefore, is to provide a method by which pulse code modulation telemetry may be recovered, even though severely degraded by noise.

Another object of the invention resides in the provision of a telemetry recovery method by which more rapid (i.e., practically instant) synchronization with a pulse code modulation waveform may be effected, if such synchronization is obtainable at all, than with the well-known bit synchronizer method.

As a further object, the invention provides a pulse code modulation telemetry recovery method that will permit substantial changes (up to ±12 percent) in the bit rate in the data and/or frame word without producing any effect on data recovery and without requiring the supply of additional parameters.

Other objects of the invention are to provide a telemetry recovery method which will be effective regardless of the transition density of the PCM waveform, and one wherein no critical adjustments of parameters are required.

Still further objects of the invention will become evident as the description thereof proceeds.

According to the present invention, the PCM signal, degraded by noise, is digitized following its demodulation from any associated carrier signals. Any time signal accompanying the PCM data is processed with the data. The result of digitizing (analog-digital conversion) is a digital magnetic tape arranged in the proper format for insertion into a digital computer. For example, this may be a format made up of 9-bit data words.

The computer performs a series of logical and numerical operations on the sequence of 9-bit words and enables the detection of the pulse code modulated waveform, ignoring the associated noise.

Figure 1:
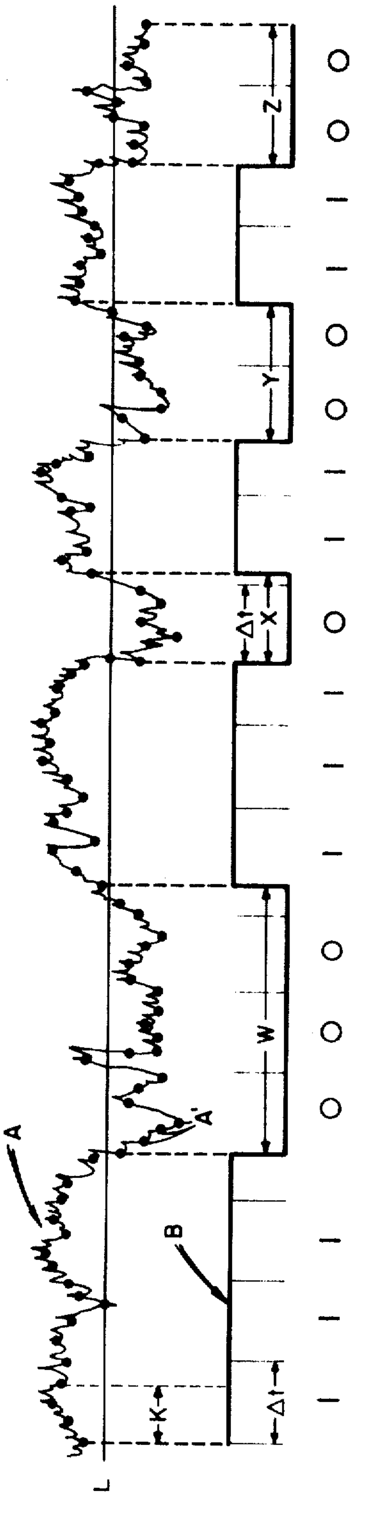
FIG. 1 is a diagrammatic view showing a pulse code modulation signal degraded by noise, and indicating transitions from which data may be recovered, sampling points used for determining the presence of said transitions being indicated by equally spaced dots.
Figure 3:
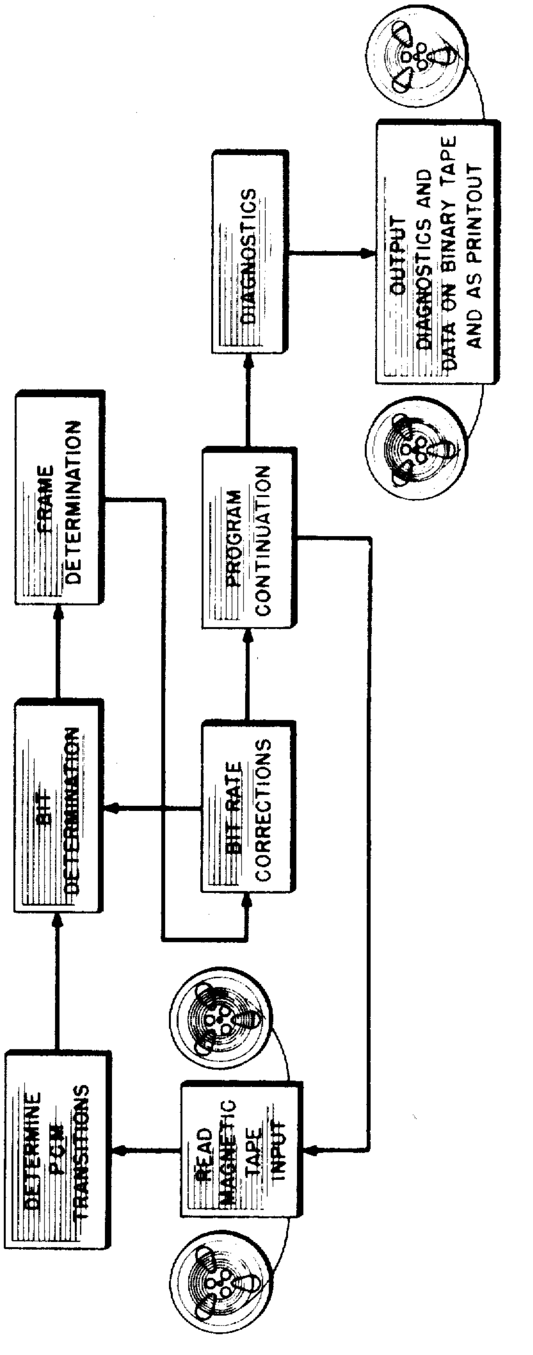
FIG. 3 is a block diagram showing the basic arrangement of the components used in the method of the invention.

Referring to FIG. 1, a PCM waveform degraded by noise is shown at A, sample points for determining transition (to be described hereinafter) being shown by dots A'. A detected waveform is shown at B. Test points, conveniently including four of the dots A', are shown at K and are referred to as K points or K values.

A bit cell period (time) is shown at $\Delta t$ in FIG. 1. For clarity, bit cell periods are shown as being divided by parallel dotted lines. A bit cell pattern consists of a plurality of serially arranged bit cell periods, and a frame word is found by successively masking the bit pattern, moving the mask one bit at a time until a frame word is found containing no more than a specified number of errors. When two successive frame words are found, the $\Delta t$ is adjusted plus or minus the amount of the preceding $\Delta t$ by no more than a specified amount to try to determine exactly 256 bits within the frame. Transitions are shown in FIG. 1 at W, X, Y, and Z, and are determined from sample points and bit cells as obtained from $\Delta t$ and rounding off.

A transition may be defined as an indication of a PCM signal in the degraded waveform. More specifically, a transition is a change from one state (voltage level) to another state (voltage level). In FIG. 1 the change is from 1 to 0.

Before a transition is detected in a PCM waveform, a series of consecutive data points must be found above or below a given level, e.g., the line L in FIG. 1. Momentary crossing of the line L by the data points is not sufficient to establish the existence of a transition in the PCM waveform.

The basic operations performed on the PCM waveform are effected as follows:

1. By taking a moving sequence of points.

2. Comparing each value of the sequence with a parameter L (transition level) until K points in succession are found above or below L. This establishes the 1 or 0 level, as the case may be. In FIG. 1 the parameter L has been shown as a straight line.

3. Continuing the examination of points until a sequence of K points lie, valuewise, on the opposite side of L (as shown by the portions of the degraded PCM waveform extending below the line L in FIG. 1).

4. Storing the time associated with the first point of the sequence of K points. This is a transition. That is, in the specific example of FIG. 1 where $K=4$, a transition is detected when at least four consecutive points fall on the opposite side of L. The transition is located at the first of the four points (a point with the same value as L is not counted as one of the four points).

5. Continuing the comparison of values of points with L and storing transition times until P points have been compared, "P points" being the number of points necessary to describe the PCM waveform over one frame interval.

The form of the output is a tabulation, printed out frame-by-frame, of the sequence of binary digits constituting the PCM data.

Figure 2:
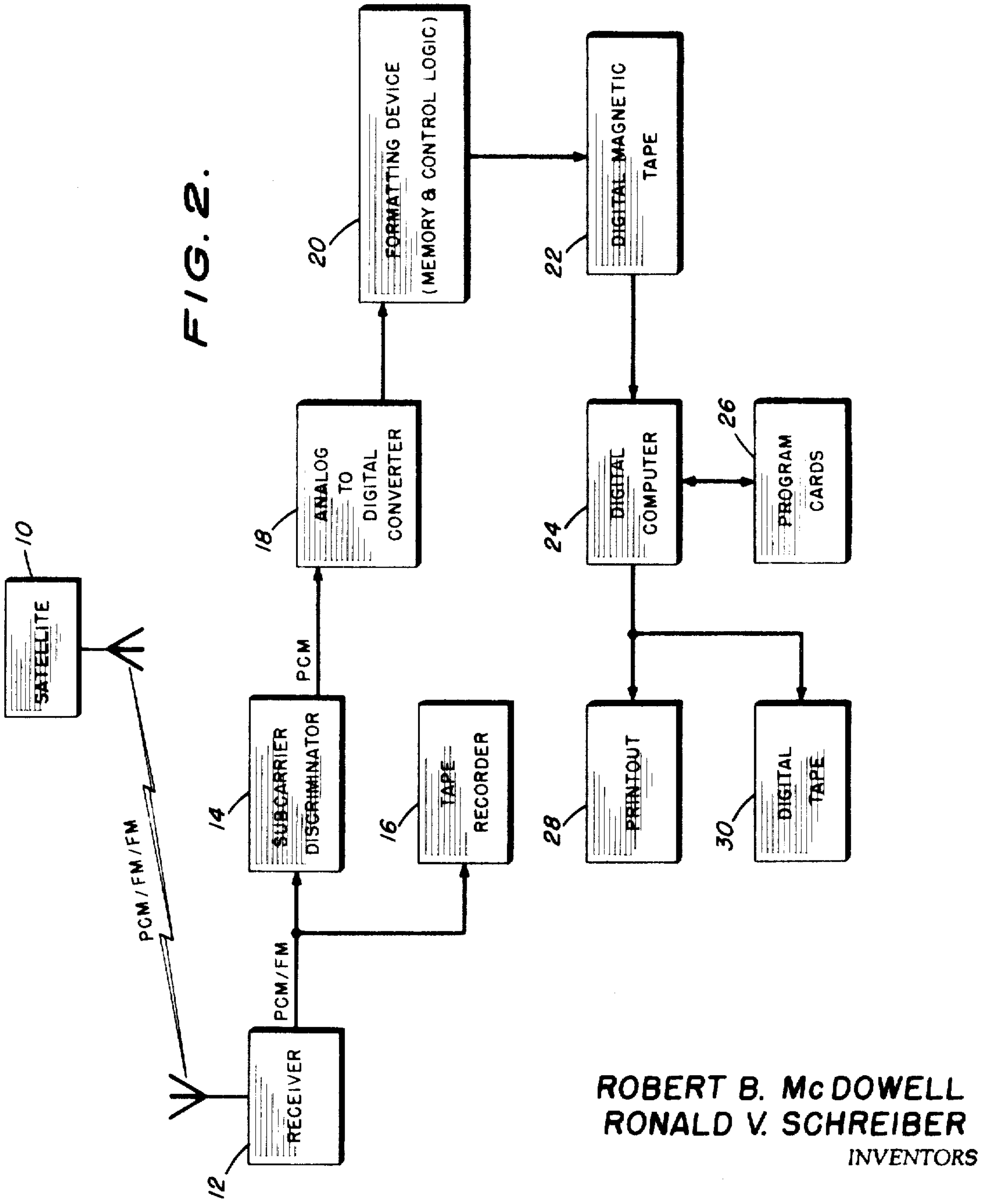
FIG. 2 is a block diagram showing how the method of the invention is carried out.

FIG. 2 is a block diagram showing the apparatus employed for carrying out the method constituting the present invention. In FIG. 2 a satellite is shown at 10, said satellite having an antenna that emits a PCM/FM/FM signal. This signal is picked up by a receiver 12 that has a PCM/FM output which is supplied to a subcarrier discriminator 14 and to a tape recorder 16. The receiver 12 may be of the type described in "Instruction Book for Model 167–D&E Special Purpose Receivers," with circuit drawing number CC-167-828, dated Aug. 9, 1950. The discriminator 14 used in one embodiment of the invention was that described in "Instruction Manual, Model GFD-2 Discriminator," with circuit drawing No. RW-005001, dated Jan. 17, 1958; manufactured by Data Control Systems, Inc., Danbury, Conn. The tape recorder 16 employed was as described in the manual for "Series FR100A Recorder/Reproducer", made by the Instrumentation Division, Ampex, Corporation, Redwood City, Calif., with specification sheet No. 2002A-6-58, dated June 1958. The tape recorder functions only to provide a means for storing the PCM/FM signal for future playback, if desired. The output of the discriminator 14 is continuous electric signal pulses (the PCM waveform representing serial binary numbers) and is fed to a standard analog-digital (A/D) converter 18. The A/D converter supplies the electrical equivalent of a set of binary numbers representing the sampled PCM waveform to a formatting device (memory and control logic) 20 which puts these binary numbers into a computer format. The formatting device 20 may conveniently take the form described in "Instruction Manual, High Speed Data Acquisition and Processing System," Volumes 1 and 2, by Radiation, Inc., Melbourne, Fla., Project 1237, dated Sept., 1960. The electrical voltage output of the device 20 is reconstituted as magnetic fields representative of these binary numbers when recorded on the storage medium 22 which may conveniently be digital magnetic tape. A digital computer 24 receives the output of the storage medium 22 reconstituted as electrical voltages and operates on it in accordance with instructions from program (punched) cards 26. More specifically, the cards are so programmed that they cause the computer to "observe" the data points present on the magnetic tape to determine the existence (or absence) of transitions according to the sequence of operation listed earlier.

The output of the computer 24 is fed to suitable printout apparatus 28 and to a digital tape storage device 30, the printout apparatus and tape storage device being of the type normally furnished with digital computers such as the IBM-7094.

The bits, coded in the PCM waveform sampled and converted to the 9-bit data words, upon which the computer 24 performs logical and numerical operations, are determined as described by the following steps:

A. Between transition, as well as at the start of the data up to the first transition, the time interval is divided by the parameter $\Delta t$ (expected bit cell period).

B. The whole number plus the result of rounding any fractional value to the nearest integer is stored.

C. Depending upon whether the leading transition is above or below the line L, the whole number (in B above) is called a corresponding number of 1's or 0's and stored sequentially.

D. The above steps are continued until all transition periods have been accounted for.

Frame determination is accomplished by the programmed computer as follows:

a. A moving sequence of 1's and 0's, stored in the order indicated above, is compared with a mask of M bits in a particular pattern of 1's and 0's (the frame word pattern) until a match is obtained for all but E bits of the mask. These bits are the acceptable errors which will be allowed in the determination of frame words. "M bits" may be defined as the number of PCM bits contained in the PCM frame word, and "E bits" may be defined as the number of PCM bits within the M bits which may be in error relative to the expected frame word pattern.

b. This frame determination is continued until all bits have been checked.

c. The sets of bits are stored in sequence beginning with the first bit of the frame word, as determined by the masking operation above-described.

d. If no frame word is found for bits not accounted for by other frames, the bits detected in the interval are listed in blocks of F bits or less. The parameter F is the number of bits in a proper frame.

The definition of a good frame is that it must contain a frame word and the correct number of bits within the frame. If more or less than the correct number of bits are determined for a frame, most of the data are normally still good. It will, consequently, be printed out in sequence with the other good frames. When frame words are not found, the preceding frame is arbitrarily made up with the correct number of bits as determined by the last properly updated $\Delta t$ or bit cell period, but this frame is also not counted as a good frame since it is not bracketed by frame words on both ends separated by the proper interval or number of bits.

Successive frame words are found by checking within a given area around the end of the normal frame interval as measured from the last frame word. The "normal frame interval" is defined as the frame length determined after all bit cell corrections for a previous good frame have been made.

The following parameters are a few of the practical ones but not limiting ones that have been established as a result of successful utilization of the invention.

1. The frame word may be any bit pattern that does not exceed 16 bits.

2. The frame length may be any length up to a maximum of 500 bits.

3. The bit rate may be anything within the limitations of the analog to digital converter.

4. Various fixed or known values for certain words within a frame may be printed out as a check or used as a frame word.

With further reference to the basic operations performed on the PCM waveform, bit rate corrections are made as follows:

(1) The number of bits between first bits of successive frame words is determined. (2) If the number is less than F, i.e., the number in a proper frame, $\Delta t$ is decreased by T seconds and the bit patterns of each frame are recomputed, in the manner used to determine the bits constituting the PCM waveform. (3) $\Delta t$ is incremented until F bits are determined or a satisfactory number of trials have been made. (4) If the number of bits in a frame is greater than F, $\Delta t$ is increased by T seconds, i.e., the number of seconds or fractions of a second by which $\Delta t$ is incremented, and a recomputation is made, in the manner used to determine the bits constituting the PCM waveform. (5) Incrementation of $\Delta t$ is again continued until F bits are determined or a suitable number of trials have been made. (6) When F bits have been determined or the necessary trials made, the next frame is processed and proper corrections computed. (7) The corrected $\Delta t$ from the preceding frame is used for the first trial on the next frame. Bit and frame determinations and bit rate corrections are made, one frame at a time, in the manner described hereinabove, in order that a continually corrected $\Delta t$ may be available for both frame detection and the first trial for bit determination in following frames.

After the first sequence of points A' of the waveform has been treated, in the manner above-described, the method is continued by treating a second sequence of points A', beginning where the first left off and by reading an additional point from the input digital tape.

The output tape of the computer 24 is loaded with framed data which is suitable for printout until 26 or for input to an analysis program.

The printout 26 may be caused to include the following diagnostic information:

a. The time of the first bit of each frame word.

b. The number of bits, short or long, for a frame after corrections.

c. The estimated bit rate after correction for each frame.

d. The frame number or other fixed or predictably changing data word contained within all or some frames.

e. A statement that no frame word was found, if such was the case, for each frame interval.

f. A list of all program parameters.

g. The total of all good frames and total of all frame intervals.

h. A tabulation of framed 1's and 0's.

During implementation of the method constituting the present invention, it was found that the most effective transition level, above or below which data were determined as either 1's or 0's respectively, fell between 192 and 256 in the 9-bit range of zero to 512. Considerable care was taken in the evaluations to center the PCM data in the subcarrier discriminator band-pass and on the analog-digital converter.

The transition test parameter of four points or more generally two-thirds of a bit cell period (the points A') was optimum to assure that the transition was legitimate and not spurious. Spurious transitions are short in duration compared to the bit cell period. Consequently, a legitimate transition is one that remains at the new level, above or below the transition level, for most of a bit cell period or longer. The transition test parameter is dependent on the sample rate. However, the optimum sample rate was found empirically to be six sample points per bit cell.

An important advantage of the method of the present invention is that the acquisition time is always one frame or less, if synchronization can be obtained at all, since there is no loop bandwidth problem. Also, up to ±12 percent changes in bit rate can occur in the date and/or frame word without affecting data recovery or change in parameters. The program corrects itself from frame to frame. A further great advantage of the invention is that the interval between transitions (transition density) is unimportant.

What we claim is:

1. A method for extracting information contained in a pulse code modulation signal degraded by noise, comprising the following steps:

demodulating the signal to produce a pulse code modulated waveform, providing analog-digital conversion of the pulse code modulated waveform to produce an electrical equivalent of binary numbers representative of the signal and degrading noise, feeding the binary numbers into a digital computer and processing them in accordance with a program for observing the existence or absence of pulse code modulation information in the binary numbers, and printing the output of the computer as a set of binary numbers, a sequence of such numbers of a given value indicating the presence of information in the signal.

2. The method of claim 1, wherein the penultimate step includes storing the binary numbers on magnetic tape, and interpreting said numbers by the use of program cards punched to provide information for indicating a pulse code modulated signal containing information.

3. The method of claim 2, including the additional step of arranging after analog to digital conversion the binary numbers in a format consisting of data defining a frame word having a predetermined number of bits, the computer performing numerical operations on the data constituting the waveform to enable the detection of the pulse code modulated waveform, ignoring the associated noise.

4. The method of claim 1, wherein the pulse code modulated waveform is sampled at a plurality of spaced points along said waveform prior to entry into the digital computer, and including the additional step of comparing said samples at said points with a given parameter until a predetermined number of points in succession, spaced from said parameter and from each other, are found, to provide bit determination, said bits forming the data words in the waveform, one of said data words constituting a frame word having a predetermined pattern of binary digits.

5. The method of claim 4, including:

the additional step of storing the time associated with the first point, to determine a transition, and the additional steps of continuing the comparison of values of points and storing transition times until the number of points necessary to describe a pulse code modulation waveform have been found.

6. The method of claim 5, including the additional step of adjusting the binary digits so that the correct number thereof appears between the first binary digits of successive frame words.

7. The method of claim 1, including the additional step of recording on digital tape the output of the computer.